United States Patent [19]

Plummer

[11] Patent Number: 4,989,959
[45] Date of Patent: Feb. 5, 1991

[54] ANTI-ALIASING OPTICAL SYSTEM WITH PYRAMIDAL TRANSPARENT STRUCTURE

[75] Inventor: William T. Plummer, Concord, Mass.

[73] Assignee: Polaroid Corporation, Cambridge, Mass.

[21] Appl. No.: 364,658

[22] Filed: Jun. 12, 1989

[51] Int. Cl.$^5$ ............................ G02B 5/06; G02B 1/00; G02B 27/12
[52] U.S. Cl. .................................... 350/447; 350/286; 350/170
[58] Field of Search .................. 350/170, 286, 447; 358/44, 43, 50

[56] References Cited

U.S. PATENT DOCUMENTS

| | | | |
|---|---|---|---|
| 1,371,969 | 3/1921 | Furman | 350/170 |
| 2,200,466 | 5/1940 | Cristiani et al. | 350/170 |
| 2,200,467 | 5/1940 | Cristiani | 350/170 |
| 2,527,896 | 10/1950 | Thirard et al. | 350/170 |
| 3,784,734 | 1/1974 | Watanabe et al. | |
| 4,101,929 | 7/1978 | Ohneda et al. | |
| 4,178,611 | 12/1979 | Okano | |
| 4,227,208 | 10/1980 | Takanashi et al. | |
| 4,318,123 | 3/1982 | Knop | |
| 4,445,136 | 4/1984 | Shinozaki et al. | |
| 4,477,148 | 10/1984 | Tsuji et al. | |
| 4,626,897 | 12/1986 | Sato et al. | |
| 4,720,637 | 1/1988 | Clark | |

FOREIGN PATENT DOCUMENTS 91412 5/1984 Japan ........................ 350/170

Primary Examiner—Jon W. Henry
Attorney, Agent, or Firm—Francis J. Caufield

[57] ABSTRACT

Optical, low-pass filter, anti-aliasing apparatus for an array of photosensor elements is a substantially wavelength independent optical, low-pass phase filter formed from a substantially transparent, convex or concave pyramidal structure.

6 Claims, 2 Drawing Sheets

ANTI-ALIASING OPTICAL SYSTEM WITH PYRAMIDAL TRANSPARENT STRUCTURE

BACKGROUND OF THE INVENTION

1. Field of the Invention

The present invention pertains to an optical, low-pass filter, anti-aliasing apparatus and, in particular, to an optical, low-pass filter, anti-aliasing apparatus for use with a focal plane array such as an image sensing device, for example, a solid-state image sensing device using a CCD (charge-coupled device) or the like, which produces a predetermined image pickup output by carrying out spatial sampling.

2. Description of the Prior Art

A color video camera typically produces a color signal output corresponding to the viewed object scene by color coding an image of the object scene with a color filter which is disposed at the front of the video camera and by spatially sampling each color using an array of photosensitive elements such as, for example, a CCD, as a solid-state image sensing device. In such an imaging system, it is well known that components in the object scene which contain frequencies too large to be analyzed with the sampling interval used contribute to the amplitudes of lower frequency components and produce, thereby, image errors which are referred to in the art as aliasing distortion or undersampling artifacts.

In general, an optical system for the array can eliminate aliasing if it has a frequency response which cuts out the higher frequency content of the object scene. As a result, it is well known in the prior art that the design of electronic imaging systems involves a trade-off between image sharpness and the susceptibility of the imaging system to aliasing distortions or undersampling artifacts. To effect this trade-off, an optical apparatus such as, for example, a birefringent blur filter has become a common component in consumer color video cameras. Such apparatus are typically placed between a lens and the photosensor array to provide a low-pass filter function which reduces the spatial frequency content of the object scene at frequencies above the Nyquist frequency of the photosensor array to make the imaging system less susceptible to aliasing distortion. For example, for many available sensors wherein equal pixel densities in each of the sensed colors provide that each of the sensed colors have the same Nyquist frequency, an achromatic low-pass filter or "blur" is effective in minimizing aliasing distortion.

An article entitled "Optical Low-Pass Filter for a Single-Vidicon Color Television Camera" by M. Mino and Y. Okano, in *Journal of the SMPTE*, Vol. 81, April, 1972, pp. 282-285 describes several desirable conditions which an optical low-pass filter used to remove aliasing distortion should satisfy. Specifically, one condition is that the optical low-pass filter should preferably be a phase filter which does not diminish the light level in the transmitted light. Another condition for the optical low-pass filter is that its effect should be independent of the aperture of the optical imaging system. In addition to these conditions, one may add the condition that the optical low-pass filter be easily manufactured at a relatively low cost.

In the art, many attempts have been made to provide apparatus to low-pass filter the spatial frequency of an object scene. However, each of these has at least one drawback. For example, an aliasing suppression phase filter which is commonly used in commercially available video cameras is a birefringent blur filter. Such a filter is typically made of crystalline quartz wherein the crystal axis of the filter plates are oriented at about a 45° angle with respect to the surface. In this orientation, the birefringent quartz exhibits the double-refraction effect, and an unpolarized input ray passing into the filter emerges as two polarized output rays. This type of filter suffers from the drawback that it is rather expensive, and it is also rather complicated to manufacture.

Another example which is well known in the art is an optical noise phase filter which is comprised of statistically distributed phase elements. The optical noise filter suffers from a drawback in that it becomes difficult for the phase elements to be distributed statistically as the aperture stop of the objective lens of the imaging system is reduced.

In addition to the birefringent blur filter and the optical phase noise filter briefly discussed above, it is well known in the art that a phase diffraction grating can be used as a frequency selective filter. However, such a grating is frequency selective, and the size of the grating is restricted by the objective aperture stop. In addition, such gratings are rather expensive and are also rather complicated to manufacture.

As one can readily appreciate from the above, there is a need in the art for an optical, low-pass, phase filter which is effective at substantially all aperture stops of an optical imaging system and which is relatively simple and inexpensive to manufacture.

SUMMARY OF THE INVENTION

Embodiments of the present invention satisfy the above-described need by providing a wavelength independent, optical, low-pass phase filter which is effective at substantially all aperture stops of an optical imaging system and which is relatively simple and inexpensive to manufacture. In particular, an embodiment of the inventive optical apparatus comprises a substantially transparent, convex, pyramidal structure comprised of four shallow, wedge-like protrusions or a substantially transparent, concave, pyramidal structure comprised of four shallow, wedge-like depressions.

In a preferred embodiment of the convex, pyramidal structure of the present invention, the wedge-like protrusions of the pyramidal structure are formed from barium flouride ($BaF_2$) which has been coated with magnesium flouride ($MgF_2$) to prevent absorption of $H_2O$. Further, the pyramidal structure may be formed on a glass plate, a plastic plate or even on the surface of a lens.

In further embodiments of the present invention, the pyramidal structure may be fabricated by pressing a softened material as, for example, a plastic material against a harder surface coating of a structure having a form which will provide either the desired convex or concave pyramidal structure in the softened material.

The inventive apparatus is preferably used by placing it in the aperture stop plane or its image where the iris would also be conveniently located for an optical imaging system. This placement ensures that the iris of the aperture stop can be opened or closed while the inventive apparatus provides substantially the same amount of low-pass filtering action.

In use, approximately one-quarter of the light incident upon the inventive apparatus passes through each facet of the pyramidal structure. Further, the wedge angle of a particular wedge portion of the inventive pyramidal structure determines the amount by which the light passing therethrough is shifted in direction. Still further, as one of ordinary skill in the art will readily appreciate, wedges disposed on opposite sides of the inventive pyramidal structure will shift the light passing therethrough in opposite directions. In accordance with this, the wedge angles of the pyramidal structure are made large enough to shift the light passing through the structure so that on average it impinges simultaneously on several pixels or sensors in the photosensor array thus forming multiple overlapping images over them. This causes a blurring effect which provides a spatial low-pass filter.

DESCRIPTION OF THE DRAWINGS

The novel features that are considered characteristic of the present invention are set forth with particularity herein, both as to their organization and method of operation, together with other objects and advantages thereof, and will be best understood from the following description of the illustrated embodiments when read in connection with the accompanying drawings wherein.

DESCRIPTION OF THE PREFERRED EMBODIMENT

Figure 1:
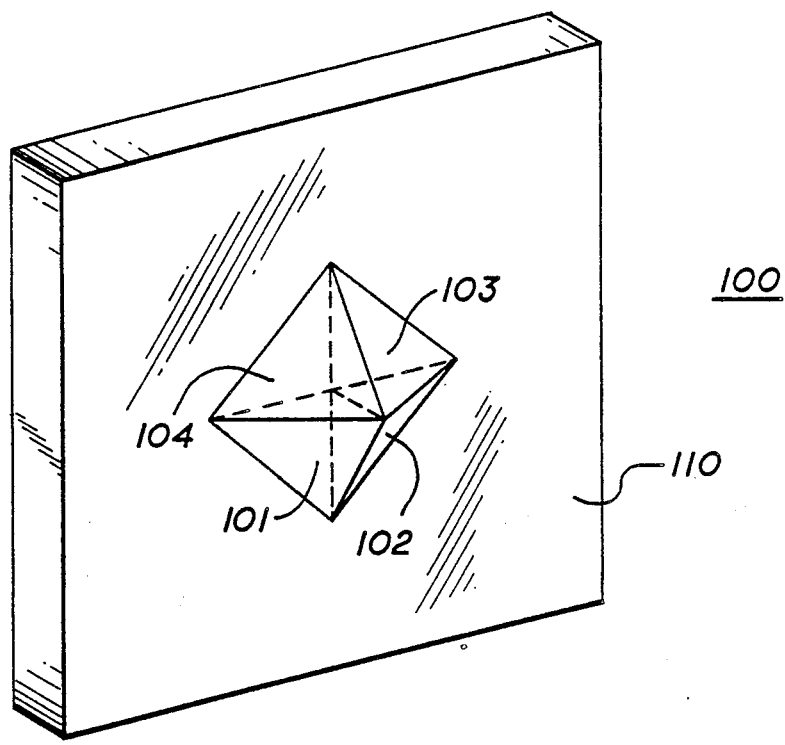
FIG. 1 shows, in pictorial form, an embodiment of the inventive optical, low-pass filter, anti-aliasing apparatus.

Referring now to FIG. 1, there is shown at 100 an embodiment of the inventive optical, low-pass filter, anti-aliasing apparatus. Specifically, apparatus 100 comprises wedges 101-104 which are disposed on glass plate 110. Wedges 101-104 are comprised of barium flouride (BaF$_2$) which has been coated with a layer of magnesium flouride (MgF$_2$) to prevent the absorption of H$_2$0.

Pyramidal apparatus 100 is fabricated in accordance with methods well known to those of ordinary skill in the art. Specifically, in one embodiment, pyramidal apparatus 100 is formed by vacuum depositing BaF$_2$ upon glass plate 110 through a square mask. The aperture provided by the square mask is gradually diminished so that the area of glass plate 110 which is exposed to vacuum deposition of the BaF$_2$ is also gradually diminished. Then, in accordance with methods well known to those of ordinary skill in the art, an MgF$_2$ coating is applied to the BaF$_2$ pyramid structure by vacuum deposition. As one can readily appreciate, this method of fabrication provides a optical apparatus which is substantially wavelength independent and which is substantially transparent to light passing therethrough.

Figure 2:
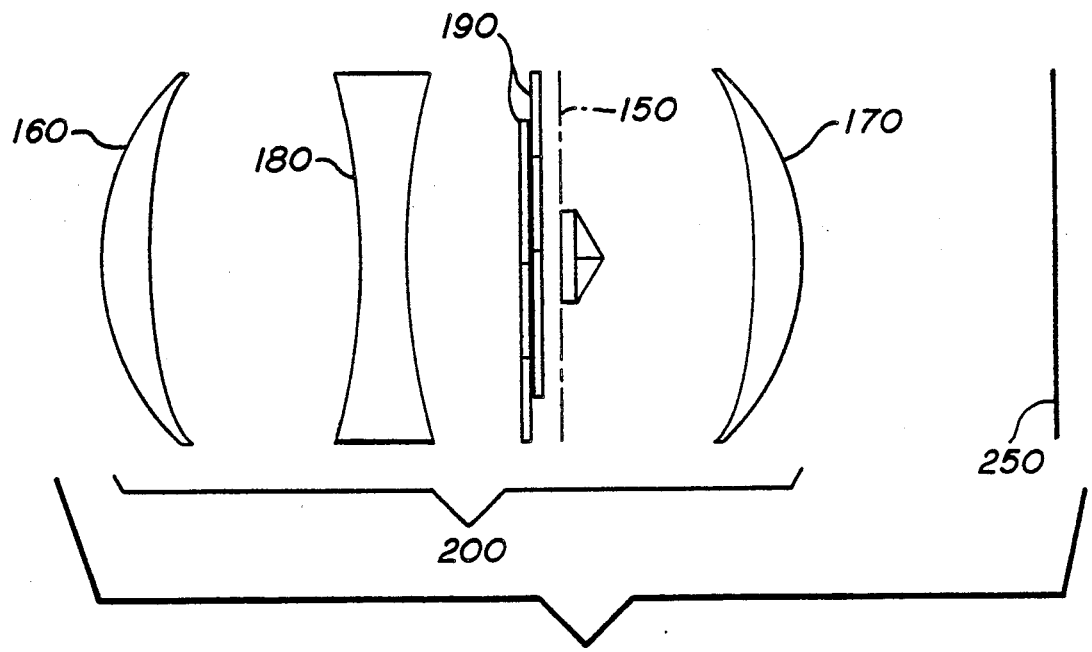
FIG. 2 shows, in pictorial form, the use of the inventive optical, low-pass filter, anti-aliasing apparatus in the aperture stop plane of an optical system.

FIG. 2 shows optical apparatus 100 disposed in aperture stop plane 150, substantially at the iris, of an optical system 200. Optical system 200 is used to image an object scene onto photosensor array 250 which is comprised of spaced apart photosensor elements, also referred to as pixels. Specifically, as shown in FIG. 2, apparatus 100 is placed at the opening of adjustable iris in the form of two counter-reciprocating shutter blades 190 located substantially at or near the aperture stop plane 150 between lenses 170 and 180 of optical system 200. Diverging lens 180 spreads the light passing between lens 160 and 170 a sufficient amount so that substantially one-quarter of the incident light which passes through optical system 200 passes through each of wedges 101-104 of apparatus 100. As one can readily appreciate from this, adjustable iris 190 at aperture stop plane 150 of optical system 200 can be opened or closed while apparatus 100 provides substantially the same amount of low-pass filtering action.

Figure 3:
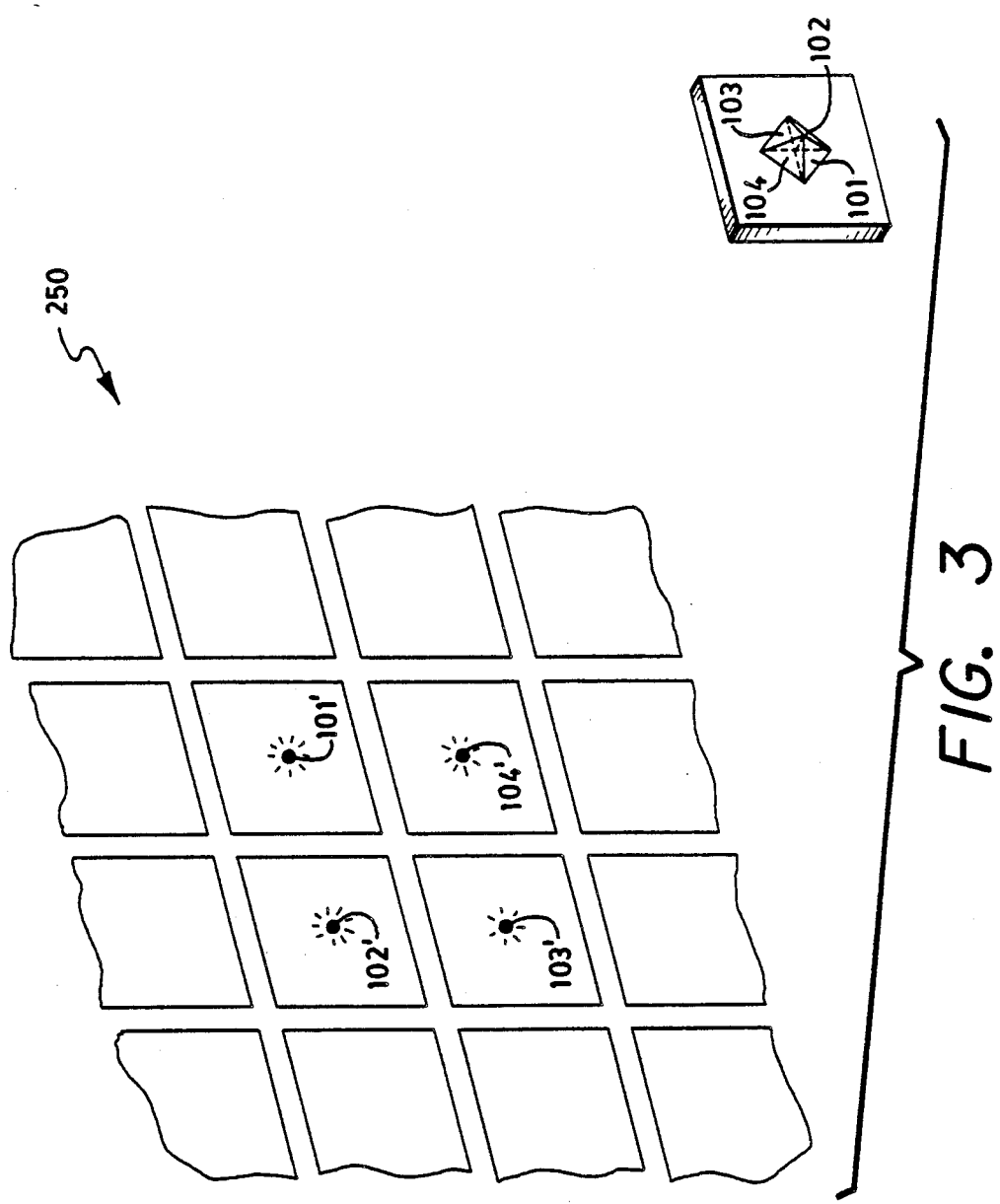
FIG. 3 is a diagrammatic perspective of a portion of the invention illustrating its action in the formation of multiple images over several photosensor array pixels.

Approximately one-quarter of the incident light passes through each wedge 101-104 of inventive apparatus 100, and the wedge angle of each wedge determines the amount by which the light passing therethrough is shifted in direction. For example, wedges disposed on opposite sides of apparatus 100, for example, wedges 101 and 103 and wedges 102 and 104, shift the light passing therethrough in opposite directions. As a result, the light which passes through apparatus 100 is shifted so that it impinges, on the average, simultaneously upon several elements or pixels in photosensor array 250 thus forming multiple overlapping images over them. This causes a blurring effect which provides a spatial low-pass filter. That is, light from an object scene which passes through each of the wedges is angled slightly away from light which passes through the other wedges. The thickness of wedges 101-104 at the center and, hence, the wedge angles, is made to be sufficiently large so that the desired blur of light which passes therethrough is obtained at photosensor array 250. This may best be seen in FIG. 3 which illustrates the action of facets, 101-104, on the image of, say, a distant star. With no wedges present, the star image would fall at the intersection of four adjacent pixels of photosensor array 250 whereas with the wedge present, four slightly displaced star images are formed, each falling on one of the four adjacent pixels as designated at 101'-104'. For objects subtending larger angles than a distant star, the multiple images formed by the facets, 101-104, obviously would be overlapped while covering more than one photosensor array pixel.

Although the we have described an embodiment of the present invention which comprises a substantially transparent, convex, pyramidal structure comprised of four shallow, wedge-like protrusions, the present invention is not limited to such embodiments. For example, further embodiments of the present invention comprise a substantially transparent, concave, pyramidal structure comprised of four shallow, wedge-like depressions. In addition, embodiments of the convex or concave inventive pyramidal structure may be fabricated by pressing a softened material such as, for example, a plastic material, against a harder surface coating of a structure having a form which will provide either the desired convex or concave pyramidal structure in the softened material. Instead of the preferred location of the inventive apparatus at or near the aperture stop of an imaging system, it could also be at or near the image of the aperture stop with beneficial effect.

Other embodiments of the invention, including additions, subtractions, deletions and other modifications of the preferred disclosed embodiments of the invention will be obvious to those skilled in the art and are within the scope of the following claims. For example, it should be clear to those of ordinary skill in the art that embodiments of the present invention are not limited to the formation of a pyramidal structure upon or in a plate and, in fact, further embodiments of the present invention comprise the formation of the pyramidal structure directly on a lens. In addition, wedges may each be fabricated separately and glued together to provide a convex, pyramidal structure. In such a case, it is advantageous to polish the outer surface of the completed apparatus after the pieces have been joined. For use with very small apertures, such that the diffraction blur of the aperture itself can accomplish the anti-aliasing function, the pyramid would be flattened at the very center, forming a frustrum.

What is claimed is:

1. An optical, low-pass filter, anti-aliasing apparatus comprising:
   an objective lens for forming an image; and
   a pyramidal structure fabricated of a substantially transparent material and located at or near the aperture stop of said objective lens or at or near its image to create a multiplicity of overlapping object images for the purpose of providing the low-pass filtering, said low-pass filtering remaining substantially constant as the aperture size of said objective lens changes.

2. The optical, anti-aliasing apparatus of claim 1 wherein the pyramidal structure is a concave structure comprised of four wedge-like depressions.

3. The optical, anti-aliasing apparatus of claim 2 wherein the angles of the wedge-like depressions are predetermined to offset the light passing therethrough by an amount sufficient to provide a predetermined low-pass filter function.

4. The optical, anti-aliasing apparatus of claim 1 further comprising an array of photosensing elements located in the imaging plane of said apparatus.

5. The optical, anti-aliasing apparatus of claim 4 wherein said pyramidal structure comprises wedge-like protrusions and said transparent material comprises barium fluoride.

6. The optical anti-aliasing apparatus of claim 4 wherein said pyramidal structure comprises wedge-like protrusions and said transparent material comprises magnesium fluoride.

* * * * *